United States Patent [19]
Ohta et al.

[11] Patent Number: 6,002,341
[45] Date of Patent: Dec. 14, 1999

[54] DOOR LOCK CONTROL APPARATUS FOR A VEHICLE

[75] Inventors: Takayuki Ohta, Kariya; Toshimitsu Oka, Okazaki; Rikuo Hatano, Toyota, all of Japan

[73] Assignee: Aisin Seiki Kabushiki Kaisha, Kariya, Japan

[21] Appl. No.: 08/979,183

[22] Filed: Nov. 26, 1997

[30] Foreign Application Priority Data

Nov. 29, 1996 [JP] Japan ................................ 8-319685

[51] Int. Cl.⁶ .................................................. G08C 19/00
[52] U.S. Cl. .............................. 340/825.31; 340/825.34; 340/825.69; 340/825.72; 307/10.1; 307/10.2
[58] Field of Search ........................ 340/825.31, 825.34, 340/825.69, 825.72; 307/10.1, 10.2; 70/256, 72, 278; 180/257

[56] References Cited

U.S. PATENT DOCUMENTS

| | | | |
|---|---|---|---|
| 4,203,039 | 5/1980 | Pritchard | 307/10.1 |
| 4,866,433 | 9/1989 | Akutsu | 340/825.31 |

FOREIGN PATENT DOCUMENTS

| | | |
|---|---|---|
| 60-65875 | 4/1985 | Japan . |
| 60-65876 | 4/1985 | Japan . |
| 60-65877 | 4/1985 | Japan . |

OTHER PUBLICATIONS

Cedric/Grolia's new–model explanation manual, Nissan Motor Co., Ltd., pp. D–40—D–46, Jun. 1991.

*Primary Examiner*—William A. Cuchlinski, Jr.
*Assistant Examiner*—Yonel Beaulieu
*Attorney, Agent, or Firm*—Burns, Doane, Swecker & Mathis, LLP

[57] ABSTRACT

A vehicle door lock control apparatus includes a remote control unit that provides instructions to effect a lock condition or an unlock condition of a door look mechanism, a door handle switch which detects the operating condition of a door handle, a door lock control unit that effects the lock condition or the unlock condition of the door lock mechanism in response to signals produced by the door handle switch or the remote control unit, and a contact electrode connected to the door lock control unit for detecting operation of the door handle through contact by a user. The remote control unit has an electrode that establishes a capacitance combination between the remote control unit and the door lock control unit.

12 Claims, 5 Drawing Sheets

DOOR LOCK CONTROL APPARATUS FOR A VEHICLE

FIELD OF THE INVENTION

The present invention generally relates to a door lock. More particularly, the present invention pertains to a door lock control apparatus for use in a vehicle for controlling a keyless entry system.

BACKGROUND OF THE INVENTION

A vehicle door lock control apparatus for a keyless entry system is disclosed in, for example, Japanese Patent Laid-Open Publication Nos. 60-65875, 60-65876 and 60-65877. Further, the Cedric/Grolia's new-model explanation manual, issued in June 1991 by Nissan Motor Co., Ltd., discloses a card entry system. The card entry system has a request switch which is mounted on the vehicle body, a card (remote controller) and a controller. If the user operates the request switch, a request ID (identification) code is transmitted to the card. The request ID code is collated with the memorized code in the card. If the request ID code corresponds to a memorized code, the card transmits an entry ID code to the controller. If the entry ID code corresponds to the memorized code in the controller, the controller instructs the door lock controller so that the vehicle door is placed in the unlocked condition.

This type of system adopts an electromagnetic induction affect to establish communication between the card and the controller. In this system, an extra antenna is necessary to establish communication between the card and the controller. Because the card does not have a manual operating function, it is not possible to instruct the controller from the card. Further, the card is so small that the user is apt to inadvertently leave the card behind.

SUMMARY OF THE INVENTION

Generally speaking, a need exists for an improved door lock control apparatus that is able to overcome the above drawbacks.

More specifically, a need exists for a door lock control apparatus which consumes a low amount of electricity.

A need also exists for a door lock control apparatus which enables use of a remote controller that is small in size.

It would also be desirable to provide a door lock control apparatus which is not apt to result in the card being inadvertently left behind.

According to one aspect of the present invention, a vehicle door lock control apparatus includes a remote control unit that provides instructions to effect a lock condition or an unlock condition of a door look mechanism, a door handle switch which detects the operating condition of a door handle, a door lock control unit that effects the lock condition or the unlock condition of the door lock mechanism in response to signals produced by the door handle switch or the remote control unit, and a contact electrode connected to the door lock control unit for detecting operation of the door handle through contact by a user. The remote control unit has an electrode to establish a capacitance coupling between the electrode of the remote control unit and the contact electrode on the door handle through the user's body.

According to another aspect of the invention, a door lock control apparatus for a vehicle includes a remote control unit for providing instruction to effect a lock condition or an unlock condition of a door look mechanism, a door handle switch for detecting an operating condition of a door handle, a door lock control unit for effecting the lock condition or the unlock condition of the door lock mechanism in response to the door handle switch or the remote control unit, and a device for establishing a capacitance coupling between the remote control unit and the door lock control unit by way of the user's body.

BRIEF DESCRIPTION OF THE DRAWING FIGURES

Other features and characteristics associated with the present invention will be more readily appreciated from the following detailed description considered with reference to the accompanying drawing figures in which like elements are designated by like reference numerals and wherein.

DETAILED DESCRIPTION OF A PREFERRED EMBODIMENT

Figure 1:
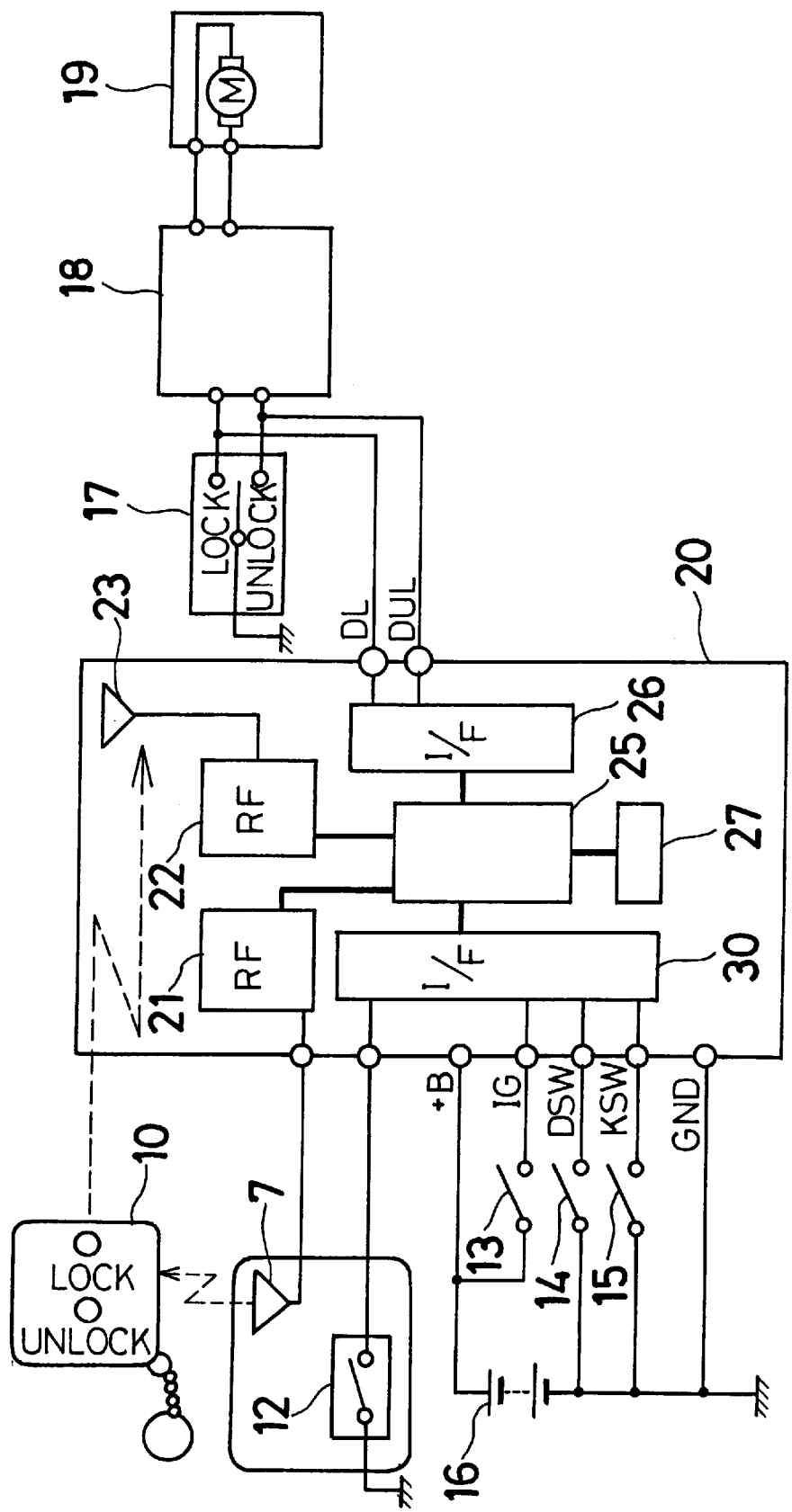
FIG. 1 is a system diagram illustrating the door lock control apparatus according to the present invention.
Figure 2:
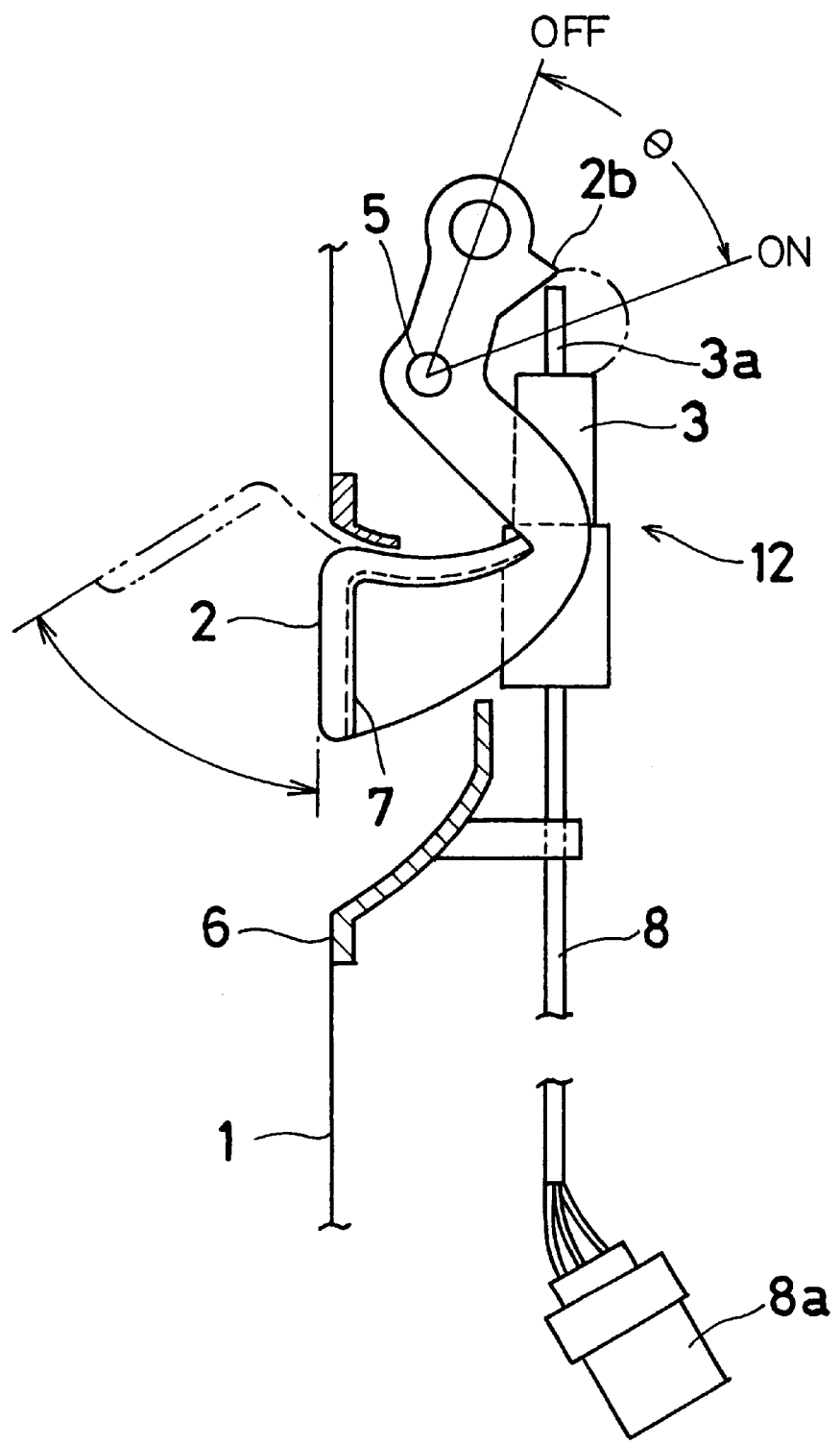
FIG. 2 is side view, partially in section, of a door locking mechanism according to the present invention.

With reference initially to FIG. 2, the door lock mechanism includes a door handle switch 2 that is mounted behind the vehicle body 1, and a door handle cover 6 that is mounted on the vehicle body 1 through a bracket. The door handle 2 is rotatably mounted on the vehicle body by way of a mounting element 5. When the door handle 2 is operated, the door handle 2 rotates about the axis of the mounting element 5 through an angle θ. In FIG. 2, the non-operational condition of the door handle 2 is represented by a solid line, while the operational condition of the door handle 2 is shown in phantom lines. When the door handle 2 is operated, the end portion 2b of the handle 2 that is remote from the end operated by the user engages the operating rod 3a of a switching portion 3. When the operating rod 3a is engaged by the edge portion 2b of the handle 2, the switching portion 3 detects the operational condition of the door handle 2. Further, when the edge portion 2b of the handle 2 engages the operating rod 3a, the switching portion 3 generates an opening signal which is transmitted through an electrical wire 8. The electrical wire 8 is connected to a door lock control circuit 20 (shown in FIG. 1) through a connector 8a.

A contact electrode 7 is disposed on the back surface of the door handle 2 at the end of the handle that is operated by the user. The contact electrode 7 is also electrically connected to the door lock control circuit 20 shown in FIG. 1.

In the schematic illustration of FIG. 1, the system includes the door lock control circuit 20 and a remote control unit 10. The system also includes a plurality of switches 13, 14, 15, a battery 16, a door handle switch 12, a contact electrode, a door control switch 17, a door control relay 18 and a door control actuator 19. The door control actuator 19 includes a motor M that is adapted to drive the door locking mechanism.

The door lock control circuit 20 is electrically connected to the positive side of the battery 16 and current is always supplied to the door lock control circuit 20. The door lock control circuit 20 includes an antenna 23, a door lock control unit 25, a memory 27, a demodulate circuit 22, an ID (identification) request signal output circuit 21, an input interface 30 and an output interface 26.

The switch 13 is an ignition switch which is adapted to detect the condition of the ignition switch while the switch 14 constitutes a door switch which is adapted to detect the door opening condition or the door closing condition of the vehicle door. The switch 15 is a key unlock warning switch which is adapted to detect whether or not a key is in the key cylinder. The output signals from these switches 13, 14, 15 are introduced to the door lock control unit 25 through the input interface 30. Further, the door handle switch 12 is connected to the input interface 30. The door lock control unit 25 processes and generates a control signal to the door control relay 18 based on the operating conditions of the switches. When a driving signal is output from the output interface 26, the relay 18 drives the motor M of the door control actuator 19. The door control relay 18 is controlled in response to a door control switch 17 or the remote control unit 10.

Figure 5:
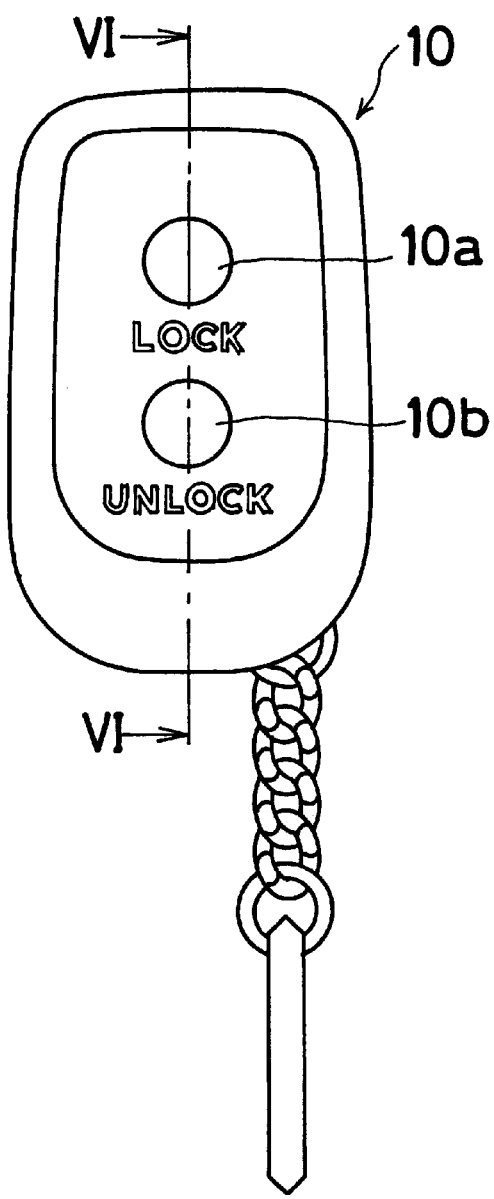
FIG. 5 is a plan view of the remote control unit shown in FIG. 4.
Figure 6:
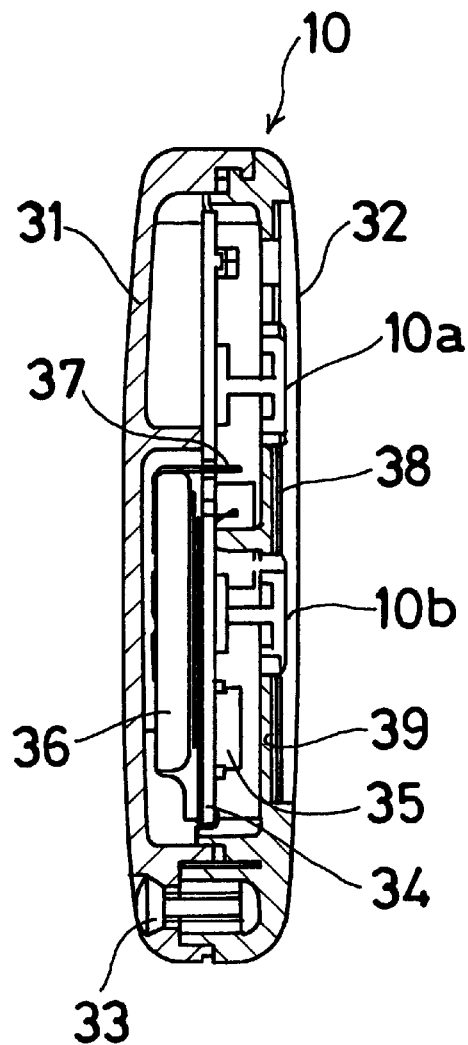
FIG. 6 is a cross-sectional view of the remote control unit taken along the section line VI—VI in FIG. 5.

FIGS. 5 and 6 illustrate details associated with the remote control unit 10 used in the apparatus of the present invention. Disposed on the remote control unit 10 are a lock switch 10a and an unlock switch 10b. These switches 10a and 10b are electrically connected to a control circuit (not shown) which is disposed in the remote control unit 10. A patterned antenna (not shown) is connected to the control circuit through a transmitting circuit. This patterned antenna transmits an ID code, which is memorized in the control circuit, to the door lock control circuit 20.

The remote control unit 10 also includes casings 31, 32 that define an interior space and a circuit board 34 that is fixed to the cases 31, 32 through a screw 33. Disposed on one side of the circuit board 34 are a receiving circuit 35, a transmitting circuit which transmits the particular or unique ID code to the door lock control circuit 20, a storage unit and a processing unit. An electric cell 36 is disposed on the reverse side of the circuit board 34. Current is supplied to the control circuit through a terminal 37. An operating surface 39 is disposed on the surface of the case 32 and an electrode 38 which functions to receive a signal from the contact electrode 7 is disposed on the operating surface 39. The electrode 38 is electrically connected to the receiving circuit 35. When the electrode 38 of the remote control unit 10 is located near the user (e.g., when a user is holding the remote control unit 10 or when the remote control unit is in the user's pocket) a capacitance coupling is established between the electrode 38 in the remote control unit 10 and the contact electrode 7 on the door handle 2 through the user's body. An ID request signal is then transmitted from the door look control circuit 20. In response to the ID request signal, the remote control unit 10 transmits a modulated signal to the door lock control circuit 20.

Having described the features comprising the door lock control apparatus of the present invention, its operation will now be explained. When the vehicle door handle 2 is operated by a user, the door handle switch 12 detects the operating condition of the door handle 2 through engagement of the end 2b of the handle 2 with the operating rod 3a. When the door handle switch 12 detects that the door handle is in the operational condition, a signal is sent to the control circuit 20 which then transmits the ID request signal to the remote control unit 10 through the ID request signal output circuit 21. The ID request signal is transmitted from the contact electrode 7 on the handle 2 to the electrode 38 of the remote control unit 10 through the user within a predetermined period. When the remote control unit 10 receives the ID request signal, the remote control unit 10 generates the particular or unique ID code and transmits the particular or unique code to the door lock control circuit 20. When the particular or unique ID code is transmitted to the door lock control circuit 20, the door lock control circuit 20 demodulates the particular or unique ID code and compares or collates it with the original ID code. If the particular or unique ID code corresponds to the original ID code, the door lock control circuit 20 controls the door control actuator 19 to effect the unlocked condition of the vehicle door.

In the embodiment described above, the remote control unit 10 is constituted by a key case type device and is attached to a vehicle key. However, it is possible to combine the remote control unit and the key as one body.

Figure 3:
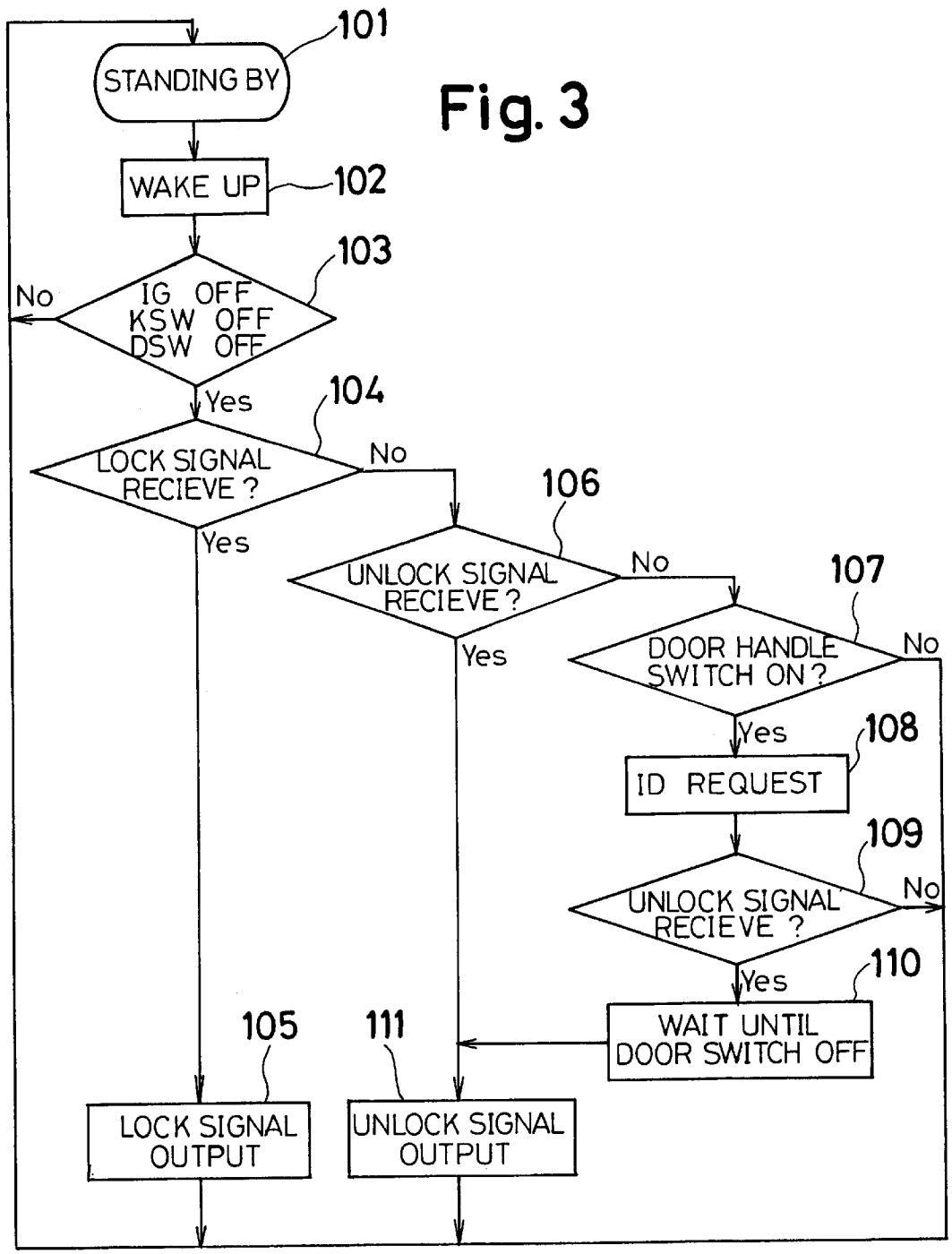
FIG. 3 is a flowchart illustrating the operation of the door lock control apparatus according to the present invention.
Figure 4:
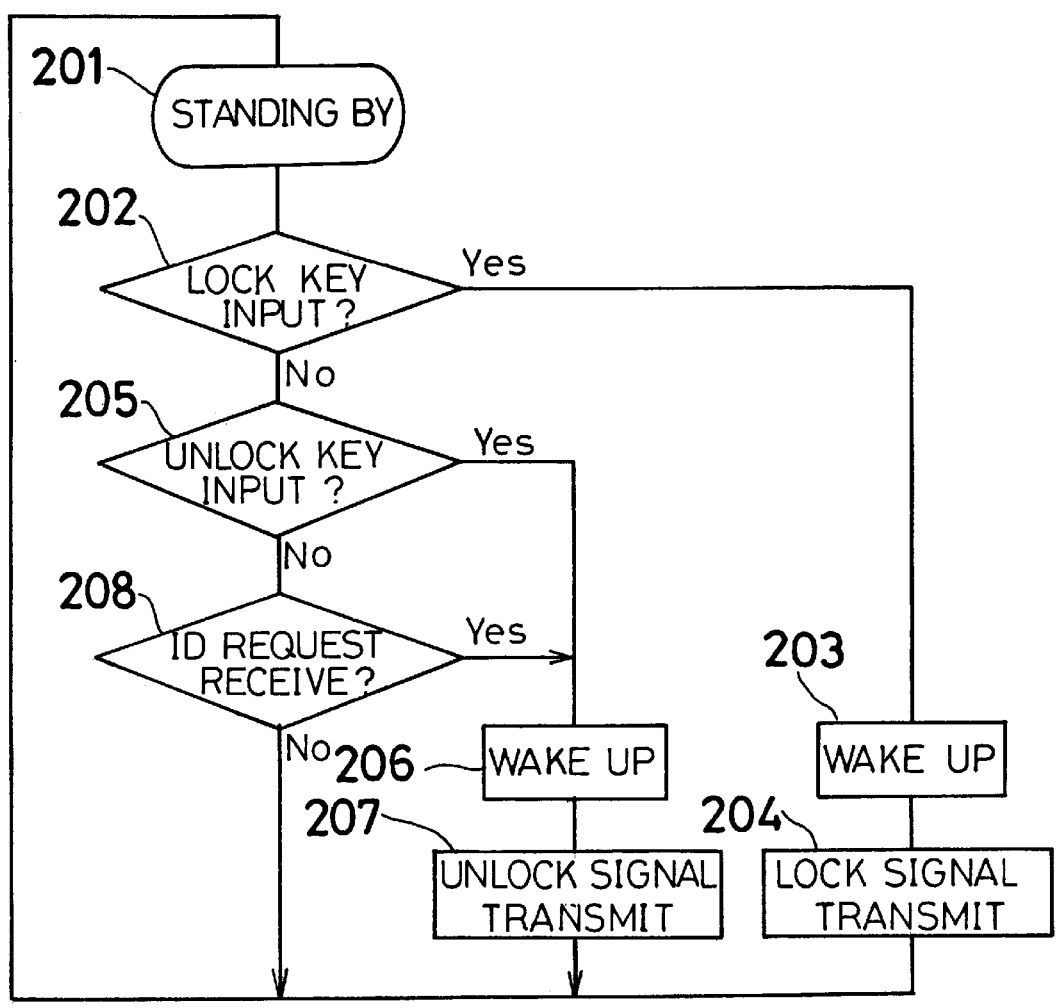
FIG. 4 is a flowchart illustrating the operation of the remote control unit used in the door lock control apparatus according to the present invention.

The operation of the door lock control apparatus of the present invention involves execution of the program routines shown in FIGS. 3 and 4. The flowchart shown in FIG. 3 represents the program routine for the door lock control unit 25. In step 101, the door lock control unit 25 is in an electricity saving mode (waiting mode). In step 102, the door control circuit 20 maintains a watch on the condition of the door control circuit 20 at a predetermined interval. In step 103, it is determined whether the ignition switch 13 (i.e., the IG switch), the key unlock switch 15 (i.e., the KSW switch)) and the door switch 14 (i.e., the DSW switch)) are in the ON condition or the OFF condition. If all three of these switches are in the OFF condition, the program proceeds to step 104. Otherwise, the program returns to step 101.

At step 104, it is determined whether or not a lock signal generated in response to operation of the remote control unit 10 has been received. If it is determined that a lock signal has been received, the program proceeds to step 105 where a lock control signal is produced. At step 105, the door lock control unit 25 generates a lock signal which is sent to the door lock relay 18 through the output interface 26 to effect locking of the vehicle door.

If it is determined at step 104 that a lock signal has not been received, the program proceeds to step 106. At step 106, it is determined whether or not an unlock signal generated in response to operation of the remote control unit 10 has been received. When the unlock signal has been received, the program proceeds to step 111 where an unlock control signal is produced. In step 111, the door look control unit 25 generates the unlock signal that is then sent to the door lock relay 18 through the output interface 26 to effect unlocking of the vehicle door.

If it is determined at step 106 that an unlock signal has not been received, the program proceeds to step 107. At step 107, it is determined whether or not the door handle switch 12 has been rendered operational (i.e., is ON). If the door handle switch 12 has been rendered operational so that the switch is ON, the program proceeds to stop 108. Otherwise, the program returns to step 101.

In step 108, the program generates and transmits an ID request signal to the remote control unit 10. At step 109, it is determined whether or not the unlock signal has been received. If the unlock signal has been received, the program proceeds to step 110. Otherwise, the program returns to step 101. In step 110, the program waits until the door switch is turned OFF and the program then proceeds to step 111 where the unlock signal is outputted.

The flowchart shown in FIG. 4 represents the program routine for the remote control unit 10. In step 201, the remote control unit 10 is standing by in an electricity saving mode (i.e., a waiting mode). If a control signal from the door lock control circuit 20 or the remote control unit 10 is generated, the remote control unit 10 changes its operating condition and moves out of the standby mode.

In step 202, it is determined whether or not the lock switch 10a has been operated. If the lock switch 10a has been operated, the program proceeds to step 203. Otherwise, the program proceeds to step 205. In step 203, the remote control unit 10 changes its operating condition and moves out of the standby mode. In step 204, the lock signal is then transmitted to the door lock control unit 25.

In step 205, it is determined whether or not the unlock switch 10b is operated. If the unlock switch 10b is operated, the program proceeds to step 206. Otherwise, the program proceeds to step 208. At step 206, the remote control unit 10 changes its operating condition and moves out of the standby mode. Then at step 207, the unlock signal is transmitted to the door lock control unit 25.

At step 208, it is determined whether or not an ID request signal has been received. When the ID request signal has been received, the program proceeds to steps 206 and 207. Otherwise, the program returns to step 201.

If the user carrying the remote control unit 10 operates the door handle 2, a capacitance combination or coupling is established between the contact electrode 7 on the vehicle door handle 2 and the electrode 38 in the remote control unit 10 through the user when the ID request signal is transmitted from the door lock control circuit 20 to the remote control unit 10. In this regard, it is possible to use a metal plated resinous door handle, a metallic door handle or a door handle coated with electrically conductive material. This can thus reduce the manufacturing cost of the door lock mechanism.

By virtue of the present invention, a door lock control apparatus is provided which is relatively compact in size and consumes a relatively small amount of electricity.

The principles, preferred embodiment, and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A door lock control apparatus for a vehicle, comprising:
   a remote control unit for providing instruction to effect a lock condition or an unlock condition of a door lock mechanism;
   a door handle switch for detecting an operating condition of a door handle;
   a door lock control unit for effecting the lock condition or the unlock condition of the door lock mechanism in response to said door handle switch or said remote control unit; and
   a contact electrode electrically connected to said door lock control unit for detecting an operation of the door handle through contact by a user, said remote control unit having an electrode for establishing a capacitance combination between said remote control unit and said contact electrode through the user.

2. A door lock control apparatus for a vehicle as set forth in claim 1, including means for outputting an identification request signal which is transmitted to said remote control unit when said door handle switch detects that the door handle has been operated.

3. A door lock control apparatus for a vehicle as set forth in claim 2, wherein when said remote control unit receives the identification request signal and said remote control unit generates a particular identification code which is transmitted to said door lock control unit.

4. A door lock control apparatus for a vehicle as set forth in claim 3, wherein said door lock control unit generates an unlock control signal when said particular identification code corresponds to an original identification code.

5. A door lock control apparatus for a vehicle, comprising:
   a remote control unit for providing instruction to effect a lock condition or an unlock condition of a door look mechanism;
   a door handle switch for detecting an operating condition of a door handle;
   a door lock control unit for effecting the lock condition or the unlock condition of the door lock mechanism in response to said door handle switch or said remote control unit;
   means electrically connected to the door lock control unit for detecting operation of the door handle through contact by a user; and
   means for establishing a capacitance combination between said remote control unit and said means for detecting operation through the user.

6. A door lock control apparatus for a vehicle as set forth in claim 5, including means for outputting an identification request signal which is transmitted to said remote control unit when said door handle switch detects that the door handle has been operated.

7. A door lock control apparatus for a vehicle as set forth in claim 6, wherein when said remote control unit receives the identification request signal and said remote control unit generates a particular identification code which is transmitted to said door lock control unit.

8. A door lock control apparatus for a vehicle as set forth in claim 7, wherein said door lock control unit generates an unlock control signal when said particular identification code corresponds to an original identification code.

9. A door lock control apparatus for a vehicle as set forth in claim 7, wherein said means for detecting operation of the door handle through contact by a user includes a contact electrode provided on the door handle.

10. A door lock control apparatus for a vehicle as set forth in claim 5, wherein said means for establishing a capacitance combination includes an electrode provided on said remote control unit.

11. A door lock control apparatus for a vehicle as set forth in claim 5, including an ignition switch for outputting a signal indicative of a condition of an ignition switch, a door switch for outputting a signal indicating whether a door is in an open condition or a closed condition, and a key cylinder switch for outputting a signal indicating whether a key is located in a key cylinder.

12. A door lock control apparatus for a vehicle as set forth in claim 5, wherein the remote control unit includes a lock switch and an unlock switch, wherein said means for establishing a capacitance combination includes an electrode provided on said remote control unit.

* * * * *